United States Patent [19]
Clark et al.

[11] Patent Number: 5,224,750
[45] Date of Patent: Jul. 6, 1993

[54] VEHICLE PIVOTAL SEAT STRUCTURE

[75] Inventors: Eric G. Clark, Shelby Twp., Macomb County; Gordon E. Segal, Livonia; Thomas E. Draplin, Southfield, all of Mich.

[73] Assignee: Chrysler Corporation, Highland Park, Mich.

[21] Appl. No.: 883,998

[22] Filed: May 18, 1992

[51] Int. Cl.⁵ .............................................. B60N 2/14
[52] U.S. Cl. .................... 296/65.1; 297/335; 297/DIG. 10
[58] Field of Search ............... 296/65.1; 297/331, 335, 297/336, DIG. 10, 326

[56] References Cited

U.S. PATENT DOCUMENTS

| | | |
|---|---|---|
| 1,261,396 | 4/1918 | Jackman . |
| 1,732,169 | 10/1929 | Provost et al. . |
| 1,879,037 | 9/1932 | Bell . |
| 3,446,527 | 5/1969 | Persson ........................ 296/65.1 |
| 3,879,082 | 4/1975 | Gwin ............................. 296/65 R |
| 3,880,464 | 4/1975 | Murphy et al. .................. 297/326 |
| 3,933,330 | 1/1976 | Gwin ................................. 248/371 |
| 4,395,011 | 7/1983 | Torta ........................... 296/65.1 X |
| 4,408,798 | 10/1983 | Mizushima et al. ................. 297/326 |
| 4,484,779 | 11/1984 | Suzuki ............................. 297/326 |
| 4,720,143 | 1/1988 | Schwartz et al. ................... 297/326 |
| 4,779,926 | 10/1988 | Maruyama ....................... 297/331 X |
| 4,925,229 | 5/1990 | Siebler ............................ 296/65.1 |
| 4,978,158 | 12/1990 | Kubo et al. ..................... 296/65.1 |
| 4,979,773 | 12/1990 | Eubank .......................... 296/65.1 |
| 5,037,155 | 8/1991 | Holm et al. ...................... 296/65.1 |

FOREIGN PATENT DOCUMENTS

| | | | |
|---|---|---|---|
| 2169503 | 7/1986 | Japan ............................ 296/65.1 |
| 229775 | 9/1989 | Japan ............................ 296/65.1 |

Primary Examiner—Robert P. Olszewski
Assistant Examiner—Gary C. Hoge
Attorney, Agent, or Firm—Edward P. Barthel

[57] ABSTRACT

In a vehicle body including a floor having a seat riser attached thereto, a pivotal seat structure including a seat back connected to a seat cushion. The seat cushion is secured to a frame member which is pivotally mounted on the seat riser. A latch assembly is operably connected between the seat riser and the seat cushion frame member. A latch release rod is operably connected to the latch assembly. A gas spring is operably connected between the seat riser and the seat cushion frame member, the frame member, seat cushion and the seat back adapted to being pivoted forwardly off of the riser by the gas spring upon manual actuation of the latch release rod.

8 Claims, 5 Drawing Sheets

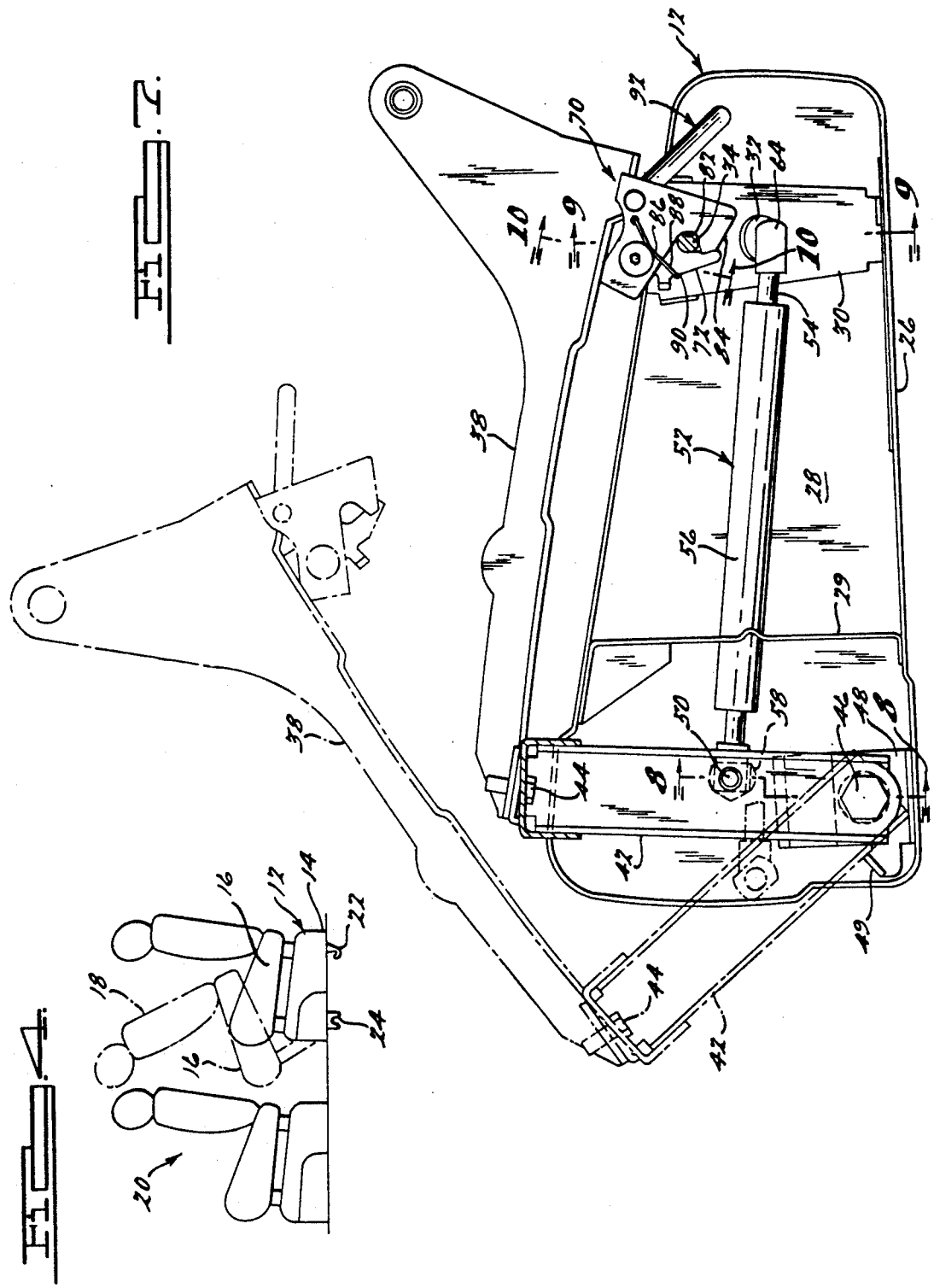

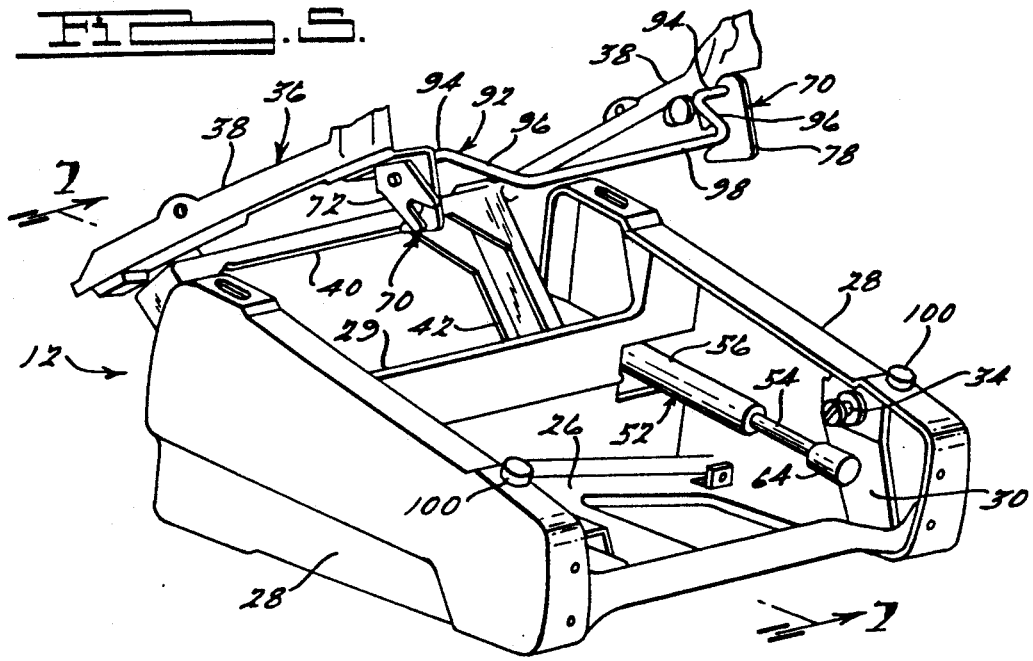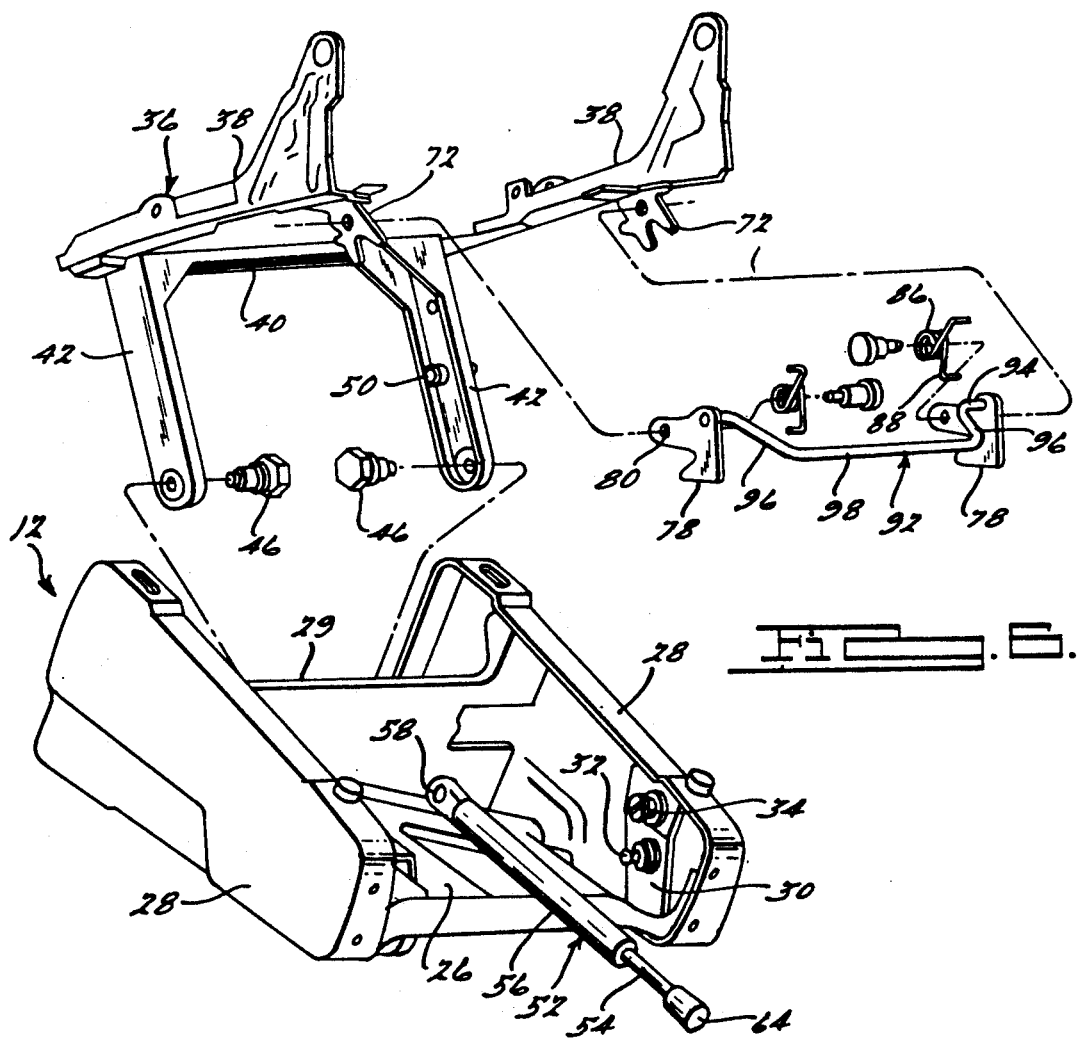

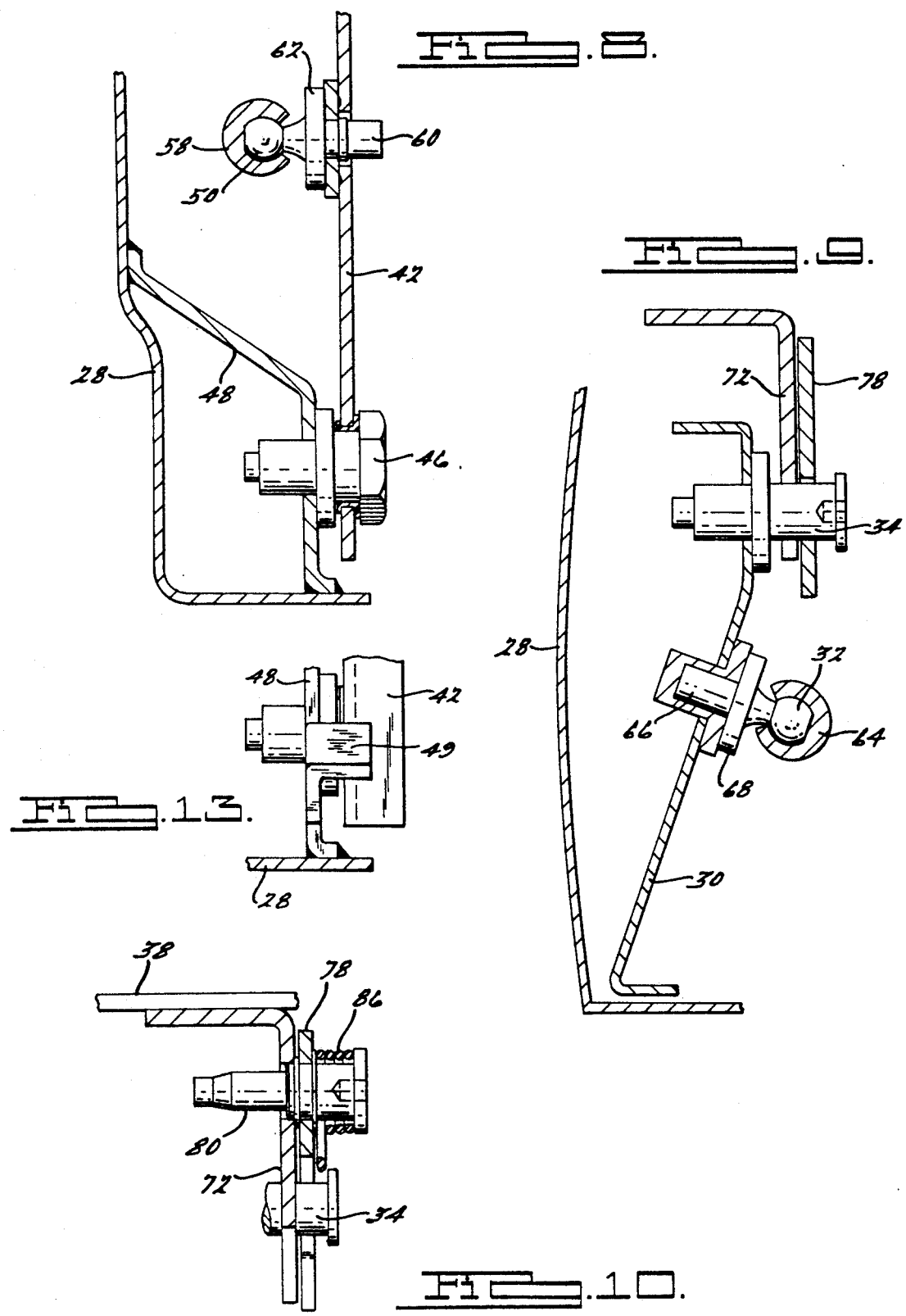

VEHICLE PIVOTAL SEAT STRUCTURE

TECHNICAL FIELD

The present invention relates generally to a vehicle seat structure for use with passenger vehicles and more particularly to a gas spring-assisted latch assembly which, upon release, tilts a vehicle seat structure forwardly off a riser without passenger assistance, providing easier access to rear areas of the vehicle.

BACKGROUND ART

The U.S. Pat. No. 4,408,798 to Mizushima et al discloses one form of a seat structure applicable for two-door type vehicles in which a front seat is manually inclinable for forming a passage allowing passenger seating in the rear seat area of the vehicle. In the Mizushima et al structure a pair of rear seat support legs are releasable from the floor panel and pivotally secured to the seat. Actuation means operates to fold the rear legs below the seat in response to inclining the front seat, providing easier access to the rear seat area. The Mizushima patent is representative of prior art tiltable seat structures wherein the operation is inconvenient in that a rear seat passenger is required to manually tilt the seat structure forwardly while getting in or out of the vehicle. Also, in cases where the vehicle is parked on an upward grade, for example, it may be necessary for an entering or exiting rear seat passenger to hold the seat in its forwardly tilted position if the pivoted seat's center of gravity is not located overcenter of its pivot axis.

Other tiltable vehicle seat structures are illustrated and described in U.S. Pat. Nos. 1,732,169 to Provost et al; 1,879,037 to Bell; 3,879,082 and 3,933,330 to Gwin; 3,880,464 to Murphy et al; 4,484,779 to Suzuki; 4,925,229 to Siebler; and 5,037,155 to Holm et al.

Schwartz et al U.S. Pat. No. 4,720,143, assigned to the assignee of the instant invention, discloses a pivotal vehicle seat and riser, having a gas spring assisted latch assembly operably connected thereto for tilting the entire seat and riser structure forwardly to an easy entry position without passenger assistance upon release of the latch.

DISCLOSURE OF THE INVENTION

A principal object of the invention is to provide an improved vehicle seat structure having a riser removably attached to the vehicle floor, wherein the seat cushion and its seat back pivot forwardly, off the top of the riser, to a tilted position for easy entry purposes.

Another object of the invention is to provide an improved vehicle seat structure which may be readily unlatched by a rear latch mechanism which, upon release, allows an extensible and retractable gas-spring actuator to pivot the seat structure from an upright position, off the riser, to a forwardly tilted position without user assistance.

A further object of the present invention is to provide a compact self-contained extensible and retractable gas spring actuator-assisted latch arrangement which, upon release, rotates a vehicle seat structure from off of the supporting riser to a forwardly tilted easy entry position without user assistance, and which maintains the seat structure in the forwardly tilted position while allowing the passenger to manually return the seat to its upright latched position with minimal effort.

Still another object of the present invention is to provide a vehicle seat structure and a gas spring assisted latch assembly operably connected to same, wherein the seat structure may be readily unlatched from its riser by means of a latch mechanism commonly operable by a latch release handle, easily accessible to a user upon entering the vehicle, and tilted forwardly off of the riser by the gas spring.

The seat structure is normally secured to a riser which, in turn, is secured to the vehicle floor. An extensible and retractable gas spring actuator has its one end pivotally connected to a forward portion of the seat and its other end pivotally connected to the riser. The actuator, which is constantly biased toward its extended position, is maintained in its retracted mode by the engaged latch. Release of the latch allows the actuator to rotate the seat forwardly off of the riser, about a transverse pivot axis to a predetermined inclined position. In this predetermined inclined position the seat center of gravity is slightly overcenter of the pivot axis with the vehicle located on a substantially level surface. Further, the gas spring actuator maintains the seat structure in its forwardly tilted position even when the vehicle is parked on a steep grade wherein the seat structure center of gravity may not have reached a point overcenter of the seat pivot axis.

These and other objects and advantages of the present invention will be more apparent when reference is made to the following description and accompanying drawings.

BRIEF DESCRIPTION OF THE DRAWINGS

FIG. 4 is a schematic side view of the seat structure of FIG. 1 in both its normal full-line position and its forwardly tilted dashed-line easy-enter position relative to a forward seat structure;

FIG. 5 is an enlarged perspective view of the inventive structure in a tilted condition, with the seat and back removed;

FIG. 6 is an exploded view illustrating the components of FIG. 5 in more detail;

FIG. 7 is a cross-sectional view, taken along the plane of the line 7—7 of FIG. 5, looking in the direction of the arrows, and showing the inboard side of the seat structure of FIG. 1, along with both the latched and unlatched positions of the seat support frame relative to the riser;

FIG. 8-10 are enlarged cross sectional views taken along the planes of the lines 8—8, 9—9, and 10—10, respectively of FIG. 7, and looking in the directions of the arrows;

FIG. 13 is an enlarged fragmentary view of the lower front portion of the FIG. 7 structure.

BEST MODE OF CARRYING OUT THE INVENTION

Figure 1:
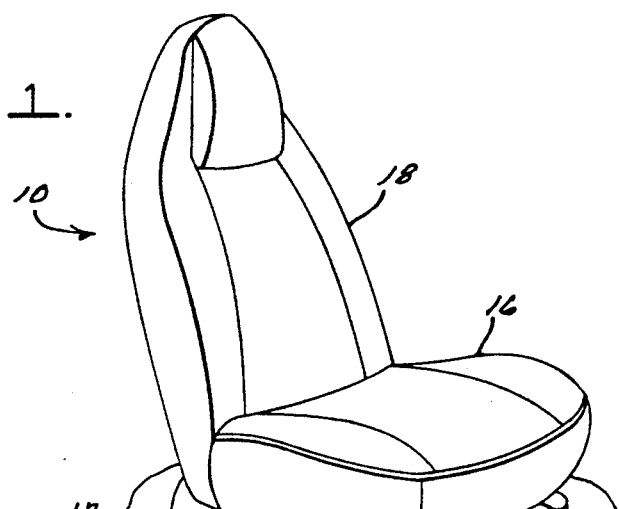
FIG. 1 is a perspective view of a vehicle seat structure embodying the present invention and shown locked in normal upright position.
Figure 2:
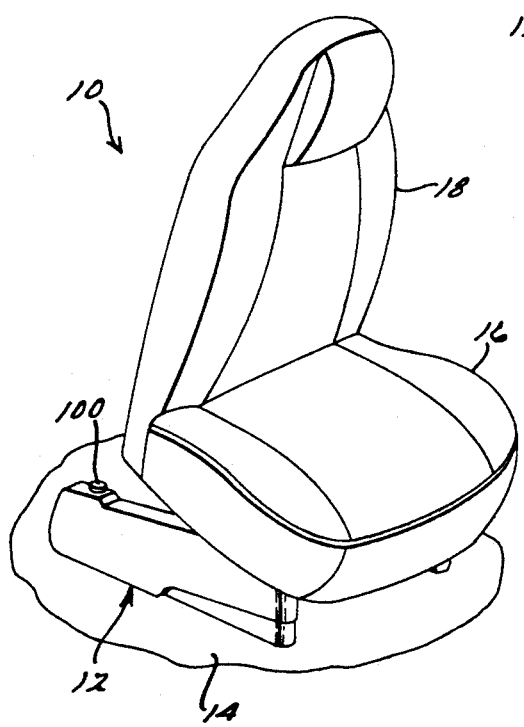
FIG. 2 is a view similar to FIG. 1 showing the seat structure tilted forwardly to its easy enter position.
Figure 3:
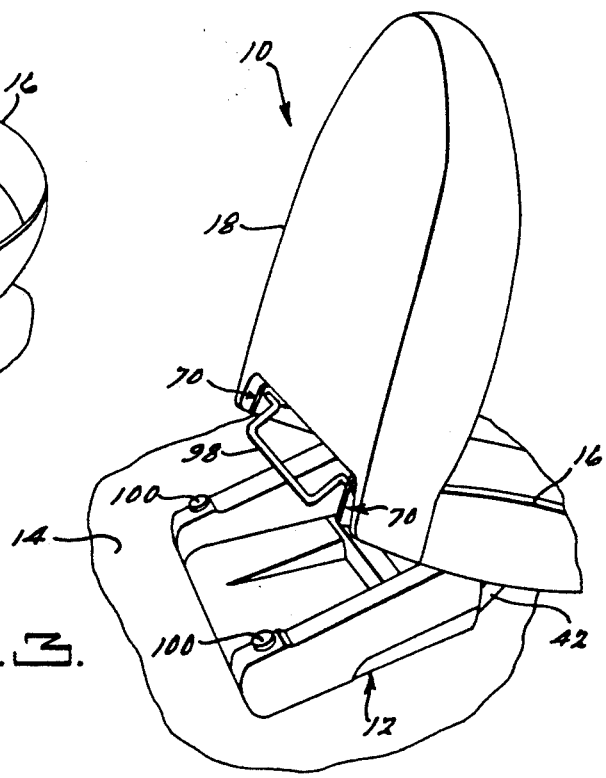
FIG. 3 is a fragmentary view similar to FIG. 2 as viewed from the rear.

Referring now to the drawings in greater detail, FIG. 1 illustrates a vehicle rear bucket seat structure 10 including a riser 12 having a painted steel outer surface, and mounted on the vehicle floor 14, with a seat cushion 16 and associated seat back 18 mounted on the riser. FIGS. 2 and 3 illustrate the seat cushion 16 and seat back 18 being pivoted forwardly off of the riser 12 via an apparatus to be described.

FIG. 4 illustrates in phantom lines the forwardmost pivoted position of the seat cushion 16 and seat back 18 relative to a fixed front seat 20 located in front of the pivotable unit. This Figure further illustrates latches 22 and 24 which typically serve to removably mount the rear bucket seat structure 10 to the floor, such as in a, so-called, mini-van type vehicle, and similar to the latching arrangement shown in patent application no. 688,398 filed by Marion C. Boone, and assigned to the assignee of the instant application.

As shown in FIGS. 5-7, the riser 12 includes a sheet metal bottom surface pan 26, side panels 28, and a reinforcing cross member 29 (FIGS. 5 and 6). A reinforcement strip 30 is secured to the side panel 28. A ball stud 32 (FIGS. 6 and 7) is fixedly secured to a central location on the strip 30, and a striker 34 is fixedly secured on the strip 30 adjacent the upper end thereof.

The seat cushion 16 is secured to a sheet metal support frame 36 having two side mounts 38 and a front mount 40. A pair of spaced hinges 42 are secured by welding at their respective upper edges to the bottom surfaces of the corners of the front mount 40. A suitable front fastener means, such as threaded bolts 44, are adapted to secure the seat cushion on the side mounts 38. The hinges 42 are pivotally mounted at their lower ends on pivot bolts 46 (FIGS. 6 and 7) secured to respective brackets 48 (FIG. 7) which, in turn, are fixedly secured to the respective side panels 28. Each bracket 48 includes a front stop flange 49 (FIGS. 7 and 13) formed integral therewith which extends laterally outwardly. Each stop flange 49 is adapted to be contacted by the adjacent hinge 42, as seen in FIG. 7, to limit the forward tilted overcenter location of the seat 16 and back 18 to the dashed line easy-entry position shown in FIGS. 4 and 7. A second ball stud 50 is fixedly secured to one hinge 42 at a location intermediate the fastener means 44 and the pivot bolt 46.

An extensible and retractable actuator in the form of a self-contained pneumatic cylinder, referred to as a "gas spring" or a "gas prop" is generally indicated at 52. The gas spring actuator 52 includes a piston rod 54 having a piston (not shown) in its inner end slidably received within a sealed tube or cylinder 56. A gas spring resembles a hydraulic cylinder with a rod, tube, piston and seals. However, unlike a hydraulic cylinder, the gas spring actuator 52 has an orifice in the piston and has no external porting. The gas spring actuator 52 is essentially a sealed cylinder containing a pressurized inert gas and a small amount of oil. The orifice within the piston assures equal pressure on each face of the piston at all static positions. A helical compression spring (not shown) may be located within the cylinder 56 to provide an initial mechanical spring biasing force causing the seat structure to pop-up an initial distance on the order of four inches. The purpose of the helical spring force is to insure that a latch initially clears a striker under all conditions, such as during low temperatures wherein the actuator 52 may be sluggish.

An example of a typical gas spring, suitable for use with the present invention, may be purchased from the Gas Spring Company, a division of Fichtel and Sachs Industries, Inc. It is understood, however, that other types of gas spring actuators may be used with the present invention without departing from the concept of the present invention. The U.S. Pat. No. 4,646,884 issued Mar. 3, 1987 to Yang, entitled EXTENDED LIFE GAS SPRING, discloses one form of gas spring actuator, the disclosure of which is incorporated by reference herein.

As seen in FIGS. 5-9, the actuator 52 has its forward end provided with a first ball socket end fitting 58 pivotally engaging the ball stud 50, including a threaded shank 60 (FIG. 8) secured by a nut 62 to the hinge 42. A second ball socket end fitting 64 is fixed to the rear end of the piston rod 54. The rearward end fitting 64 pivotally engages the ball stud 32, including a threaded shank 66 secured by a nut 68 to the reinforcement strip 30. The fitting 58/ball stud 50 and fitting 64/ball stud 32 may be different sizes to prevent any improper assembly of the actuator 52.

Figure 11:
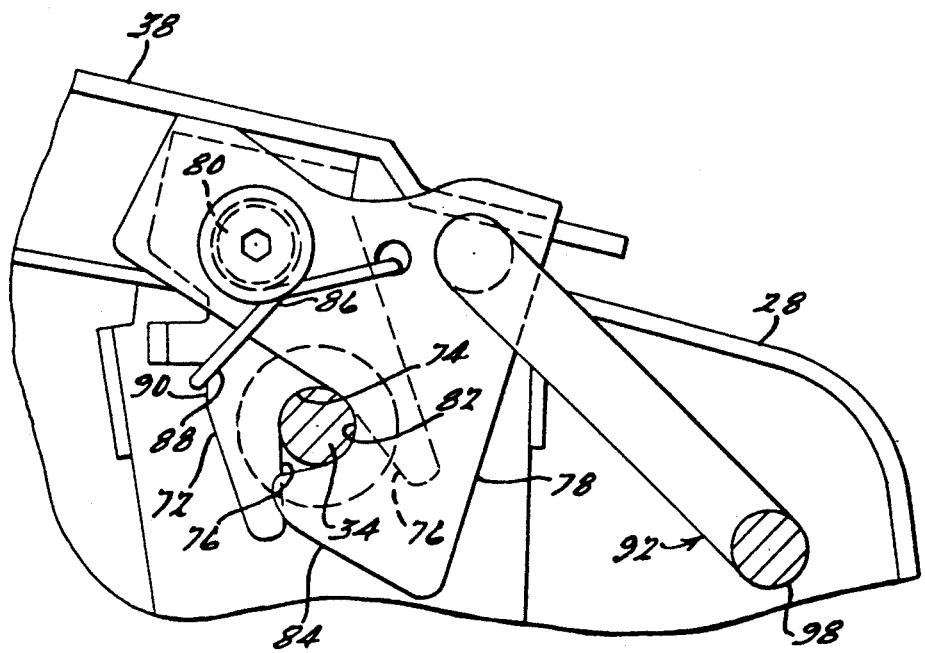
FIG. 11 is an enlarged fragmentary vertical elevational view of the release latch mechanism in its latched mode.
Figure 12:
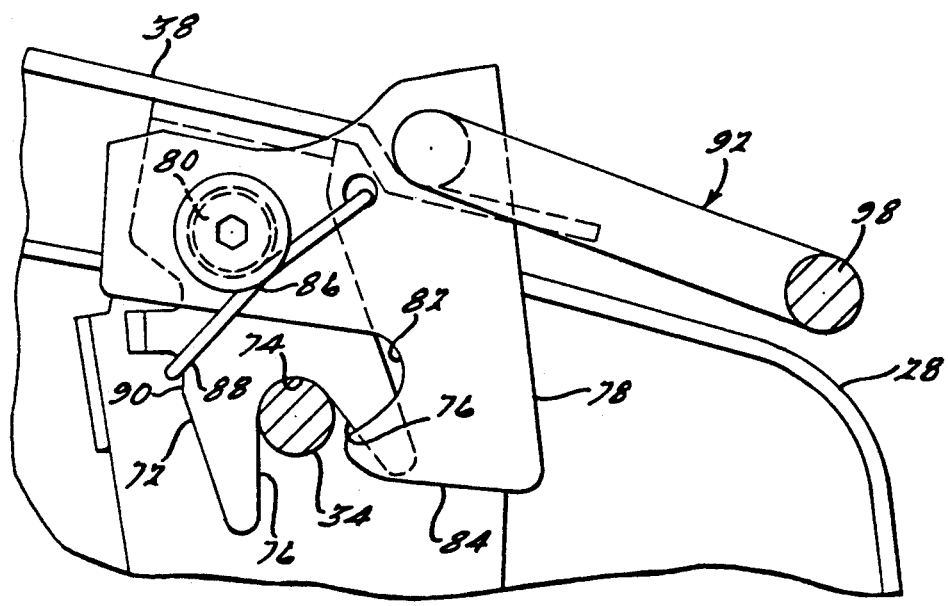
FIG. 12 is a view similar to FIG. 11 showing the release latch mechanism in its released mode.

The latch assembly, shown generally at 70 (FIGS. 5 and 7), includes a first pair of latch plates 72 secured at their upper ends to the bottom surfaces of the rear portions of the seat cushion side mounts 38. The lower edge of each latch plate 72 has a central striker receiving slot 74 which opens downwardly by a pair of diverging edges 76 effective to cam the striker 34 into the slot upon pivoting the seat rearwardly to its upright position. A second pair of latch plates 78 are pivotally connected by pivot pins 80 to an upper portion of the respective first pair of latch plates 72. Each latch plate 78 includes a striker receiving notch 82 and a striker engaging cam edge 84 adapted to overlie the slot 74 so as to be engaged by the striker 34 upon returning the seat cushion 16 and seat back 18 to their upright position. By virtue of the cam edge 84 engaging the striker 34, the plate 78 is urged counterclockwise in FIG. 11 around the striker 34, from the position of FIG. 12 to the latched position of FIG. 11, wherein the striker is confined between the first latch plate slot 74 and the second latch plate notch 82. The latch plate 78 is resiliently urged to the latched position of FIG. 11 by means of a coil tension spring 86 mounted around the pin 80. The latter spring 86 includes an extended hook end 88 connected to a recessed edge 90 formed on the first latch plate 72.

As seen in FIGS. 5 and 6, a release rod 92 includes laterally extending ends 94 fixedly secured to the respective second latch plates 78, rearwardly extending segments 96, and an interconnecting laterally extending handle segment 98.

A pair of bumpers 100 are mounted on the upper surfaces of respective rear portions of the riser side walls 28 to receive the bottom lower rear end surfaces of the seat cushion side frame mounts 38 when the latch assemblies 70 are latched around the strikers 34.

In operation, for the passenger to incline the seat back 18 and the seat cushion 16 forwardly to provide an entrance to the rear seat area, the latch plates 78 are operated to release the strikers 34 by manually lifting the release rod 92. As a result, the gas spring 52, which is held in its fully retracted position with the seat cushion 16 locked in its FIG. 1 upright mode, urges the seat cushion 16 and seat back 18 to rotate about the hinge pivot pin 46 to its forwardly tilted overcenter mode shown in FIGS. 2 and 3, off of the riser 12, through an angle of about 45 degrees to its forwardly inclined easy enter mode. To accomplish this, the gas spring actuator 52 is pivotally extended through a small angle for a predetermined distance, as shown by the dashed-line position of FIG. 7.

INDUSTRIAL APPLICABILITY

It should be apparent that the invention provides an efficient, easily operable, pivotal vehicle bucket seat structure serving to enable passengers to conveniently enter the rear seats of a small van, past the riser of the pivoted bucket seat structure.

It should be further apparent that the gas spring eliminates the need to manually pivot the seat cushion and back off of the riser, since it effectively automatically completes the forward pivoting motion once the passenger lifts a readily accessible latch assembly rod.

While but one embodiment of the invention has been disclosed and described, other modifications thereof are possible within the scope of the following claims.

What is claimed is:

1. In a vehicle body including a floor having a seat riser attached thereto, a pivotal seat structure comprising a seat back connected to a seat cushion, said seat cushion being secured to a frame member which is pivotally mounted on said seat riser, a latch assembly operably connected between said seat riser and said seat cushion frame member, latch release means operably connected to said latch assembly, a gas spring operably connected between said seat riser and said seat cushion frame member, and a pair of hinges fixedly secured at their upper ends to a front bottom surface of said seat cushion frame member, and pivotally connected at their lower ends to a front lower end portion of said riser, said gas spring having its forward end pivotally connected to a mid portion of one of said hinges, said seat cushion and said seat back adapted to being pivoted forwardly by said gas spring upon manual actuation of said latch release means through a predetermined angle to a forwardly inclined easy enter mode, free of any rear end connectors to said riser.

2. The pivotal seat structure described in claim 1, and a pair of reinforcement strips mounted in a vertical orientation on a rear portion of said riser, said gas spring having its rearward end pivotally connected to a mid portion of one of said reinforcement strips.

3. The pivotal seat structure described in claim 2, wherein said riser includes a bottom wall, oppositely disposed side walls, and a reinforcing cross member between said two side walls; and said seat cushion frame member includes a pair of hinges extending downwardly from opposite front corners thereof and pivotally connected at their distal ends to said side walls, said gas spring being pivotally connected at its leading end to one of said hinges and at its trailing end to one of said reinforcement strips.

4. The pivotal seat structure described in claim 1, wherein said latch release means includes a rod.

5. The pivotal seat structure described in claim 4, wherein said latch assembly includes a pair of first latch plates fixedly secured to a rear bottom surface of said seat cushion frame member, a pair of spring-loaded latch plates pivotally mounted on said pair of first latch plates, respectively, said latch release rod having its respective ends secured to said pair of spring-loaded latch plates.

6. The pivotal seat structure described in claim 1, and a pair of solid bumpers mounted on oppositely disposed rear upper surfaces of said riser for engagement by oppositely disposed rear bottom surfaces of said seat cushion frame member.

7. The pivotal seat structure described in claim 1, wherein said predetermined angle is 45°.

8. In a vehicle body including a floor having a seat riser attached thereto, a pivotal seat structure comprising a seat back connected to a seat cushion, said seat cushion being secured to a frame member, a pair of hinges fixedly secured at their upper ends to a bottom surface of said frame member, and pivotally connected at their lower ends to a front lower end portion of said riser, a pair of reinforcement strips mounted in a vertical orientation on a rear portion of said riser, a latch assembly including a pair of first latch plates fixedly secured to rear bottom surfaces of said frame member, a pair of spring-loaded latch plates pivotally mounted on said pair of first latch plates, respectively, and a striker means fixedly secured to rear upper portions of said riser releasably engagable by said respective pairs of first latch plates and spring-loaded latch plates, a latch release rod having its respective ends secured to said pair of spring-loaded latch plates, a gas spring having its forward end pivotally connected to a mid portion of one of said hinges and its rearward end pivotally connected to a mid portion of one of said reinforcement strips and being operably connected between said seat riser and said seat cushion frame member, said seat cushion and said seat back adapted to being pivoted forwardly by said gas spring upon manual actuation of said latch release rod through 45° to a forwardly inclined position, free of any rear end connectors to said riser, and a pair of bumpers mounted on oppositely disposed rear upper surfaces of said riser for engagement by oppositely disposed rear bottom surfaces of said frame member side mounts.

* * * * *